United States Patent
Wellman

(10) Patent No.: US 8,886,599 B2
(45) Date of Patent: Nov. 11, 2014

(54) SYSTEM FOR UPDATING A NAVIGATION DATABASE

(75) Inventor: Harald Wellman, Hamburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 802 days.

(21) Appl. No.: 11/971,548

(22) Filed: Jan. 9, 2008

(65) Prior Publication Data

US 2009/0024656 A1 Jan. 22, 2009

(30) Foreign Application Priority Data

Jan. 10, 2007 (EP) ..................................... 07000468

(51) Int. Cl.
- *G06F 7/00* (2006.01)
- *G06F 17/30* (2006.01)
- *G06F 17/00* (2006.01)

(52) U.S. Cl.
CPC .... G06F 17/30241 (2013.01); G06F 17/30569 (2013.01); *Y10S 707/92* (2013.01)
USPC ............ 707/620; 707/625; 707/626; 707/920

(58) Field of Classification Search
USPC ........... 707/999.001–999.005, 610, 920, 620, 707/625, 626
See application file for complete search history.

(56) References Cited

U.S. PATENT DOCUMENTS

| | | | |
|---|---|---|---|
| 6,018,695 A | | 1/2000 | Ahrens et al. |
| 6,289,276 B1 * | | 9/2001 | Ahrens et al. ................. 701/200 |
| 2002/0073067 A1 * | | 6/2002 | McGrath et al. .................. 707/1 |
| 2004/0104842 A1 * | | 6/2004 | Drury et al. ................... 701/208 |
| 2005/0192950 A1 * | | 9/2005 | Nomura ............................ 707/3 |
| 2007/0156759 A1 * | | 7/2007 | Sekine et al. ............. 707/104.1 |

FOREIGN PATENT DOCUMENTS

| | | |
|---|---|---|
| JP | 11-272596 A | 10/1999 |
| JP | 2002-221421 A | 8/2002 |
| JP | 2002 296042 A | 10/2002 |
| JP | 2005-283880 A | 10/2005 |
| JP | 2006-155375 A | 6/2006 |

OTHER PUBLICATIONS

Korean Office Action, Jan. 14, 2014.

* cited by examiner

*Primary Examiner* — Kannan Shanmugasundaram
(74) *Attorney, Agent, or Firm* — O'Shea Getz P.C.

(57) ABSTRACT

A navigation system including a navigation database provides efficient and accurate database updates. The system receives a modified version of the navigation database. The system identifies data blocks of the modified version that differ from the corresponding data blocks of the navigation database. The system generates an update based on the identified differences. The system updates the navigation database using the generated update.

22 Claims, 5 Drawing Sheets

SYSTEM FOR UPDATING A NAVIGATION DATABASE

PRIORITY CLAIM

This application claims the benefit of priority from European Patent Application No. 07000468.4, filed Jan. 10, 2007, which is incorporated by reference.

BACKGROUND OF THE INVENTION

1. Technical Field

The inventions relate to databases, and in particular, to updating databases in navigation systems.

2. Related Art

A navigation system uses digital maps to display streets, buildings, rivers, and other features on varying scales. Navigations systems provide direction and routing information to localities of interest to the user. Digital map databases for vehicle navigation systems may be stored on removable storage media, such as CDs or DVDs, or on hard drives installed internal to the vehicle.

Mapping information changes regularly as new streets are built, new freeway exits are constructed, points of interest to the user are renamed, moved, or deleted from a map, or other changes occur that affect the accuracy of maps. Digital map content should be updated frequently to provide the user with reliable information. Updating systems can be costly, cumbersome, and time consuming. Therefore, a need exists for a system that efficiently updates navigation systems to maintain accurate and up-to-date digital maps.

SUMMARY

A navigation system including a navigation database provides efficient and accurate database updates. The system receives a modified version of the navigation database. The system identifies data blocks of the modified version that differ from the corresponding data blocks of the navigation database. The system generates an update based on the identified differences. The system updates the navigation database using the generated update.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
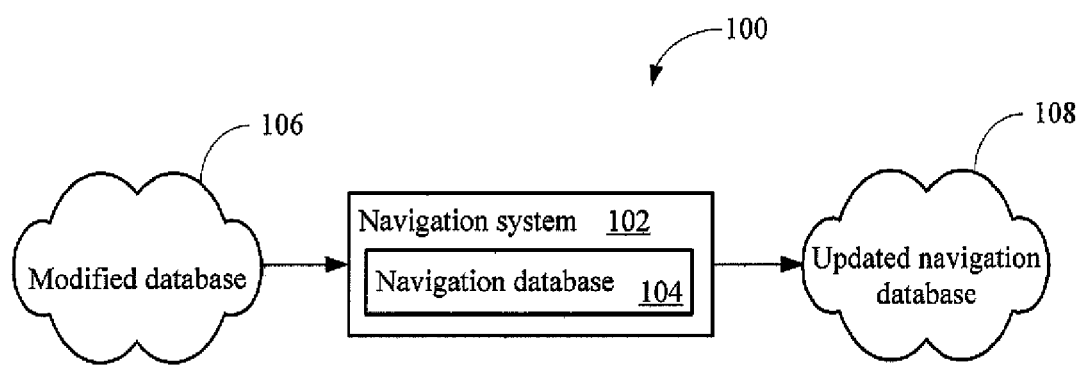
FIG. 1 is a flow diagram of an exemplary navigation database updating process.

FIG. 1 is a flow diagram of an exemplary navigation database updating process 100. A navigation system 102 comprising a navigation database 104 may obtain a modified navigation database 106. The navigation database 104 may include data blocks and records that specify objects associated with a digital map. The objects may include closure of a street, speed limit zone, or other attributes of a geographic object. The modified navigation database 106 may be a modified or subsequent version of the navigation database 104. The modified database 106 may include data blocks that correspond to the data blocks of the navigation database 104, where some of the data blocks of the modified navigation database are changed or are different relative to the navigation database 104. The system 102 may compare the databases 104 and 106 to identify data blocks of the modified navigation database that differ from the corresponding blocks of the navigation database 104.

The system 102 may generate an update package 108 based on the identification of data blocks that differ between the navigation database 104 and the modified navigation database 106. The update package 108 may include the data blocks of the modified navigation database that differ from the corresponding data blocks of the navigation database 104. The system 102 may update the navigation database 104 based on the generated update package 108 to provide an accurate and up-to-date navigation database.

Figure 2:
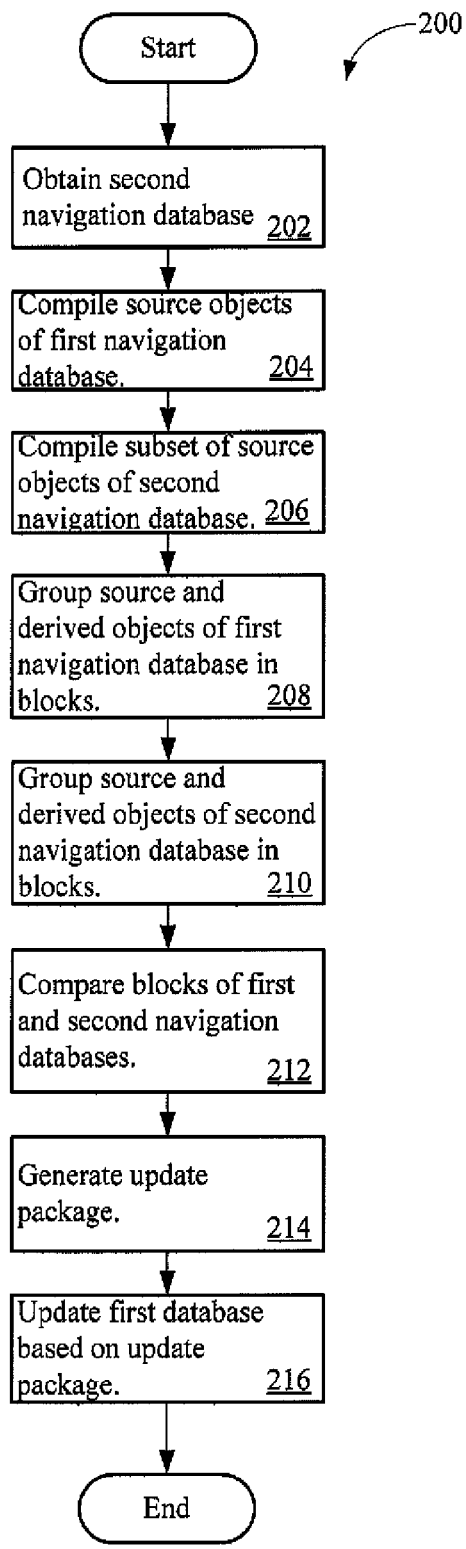
FIG. 2 is an exemplary process for updating a first navigation database.

FIG. 2 is an exemplary process 200 for updating a first navigation database. The first navigation database may include vehicle navigation, geographic, and/or other data related to digital maps. The process 200 may obtain a second navigation database (Act 202). The second navigation database may be a modified version of the first navigation database that includes vehicle navigation, geographic, and/or other data related to digital maps. The second navigation database may be a parent database generated by a provider and may represent a modification of an older parent database. The first navigation database may be a copy of the older parent database from which the second navigation database is a modified. For example, source objects of the second database may differ from corresponding source objects in the first database. The provider may be a vendor or other distributor of navigation systems and/or digital maps that may be uploaded to a navigation system. The second navigation database may be obtained through an internet connection. In a vehicle navigation system, the second navigation database may be downloaded automatically or at a user's request from the provider. The second navigation database may be downloaded directly to a vehicle. The second navigation database may be stored and provided to a user on a computer-readable medium, such as a CD or DVD.

The data of each of the databases may be organized in logically related blocks on a memory. Each of the blocks may include one or more records that specify objects and their attributes. Objects may be roads, landmarks, points of interest ("POIs"), and/or other geographic localities represented in a digital map presented to a driver. The POIs may include service stations, police stations, hotels, restaurants, or other locations. Object attributes may include characteristics of the roads, landmarks, and/or POIs, such as the kind of food offered in a restaurant (e.g., "Italian").

Objects specified by the records of the first and second navigation databases may include source objects and derived objects. A source object may be an object that is not derived from other object(s) during database compilation. Source objects may include map geometry and road topology at a lowest organizational level of the map. Source objects may also include data related to object attributes, such as name attributes of cities and streets.

Derived objects may include objects that are computed or compiled from source objects or other derived objects during database compilation. Derived objects and data may include data known from source objects or other derived objects on a higher organization level. The derived objects may accelerate operation of the navigation software, such as with a higher level of routing and map display. In one example, derived objects may include data on a scale with tiles of about 10 km in a map with a lowest map level showing tiles with an edge length of about 100 meters. Derived objects may also include data associated with name indices.

Each block of the first and second navigation databases may be assigned a block number. A block of the second navigation database may correspond to a similar block of the first navigation database that specifies the same or similar objects. If the data of the first navigation database and the second navigation database is each grouped in n blocks, block number 1 of the first navigation database may correspond to block number 1 of the second navigation database and so on up to corresponding blocks n of each of the databases. The second navigation database may include a new source object with no corresponding object in the first navigation database, such as a newly built street not present in the digital map of the associated with the first navigation database.

The records of the blocks may be defined with a self-describing format to allow forward and backward compatibility of different versions of the same navigation database. The first and/or the second navigation databases may be an object-oriented database that includes transparent persistence.

The process 200 may compile the source objects of the first navigation database (Act 204). Compiling the source objects of the first navigation database may generate derived objects of the first navigation database. All, or substantially all, of the source objects of the first navigation database may be compiled to generate the derived objects of the first navigation database.

In an alternative, the process 200 may use an incremental database updating technique. The first navigation database may include information about the dependency of the derived objects on other derived objects and/or on source objects. The process 200 may compare the corresponding source objects and derived objects between the first and second navigation databases and compile just those source objects and derived objects of the first navigation database that differ from the corresponding objects in the second navigation database.

Compilation of the database may be performed by a database compiler that includes access to all derived objects created in some or all of the previous compilation and includes information about the dependency relations between objects. The compiler may be a unitary part of or interface a remote navigation system to be updated. Alternatively, the compiler may be installed on a remote computer, where compilation may be performed for a copy of the database that is physically present on some storage medium used by the navigation system installed in a vehicle.

The process 200 may scan all, or substantially all, object dependencies. Based on the information about the dependency relations the process 200 may (re)build the derived objects that depend on objects that correspond to objects that have been changed in the second navigation database with respect to the corresponding objects of the first navigation database. Such changes may be determined before compilation of the first navigation database. Compilation of the second database may be performed by a similar incremental compilation. If a source object of the second navigation database is changed, it may not be necessary to compile the entire second navigation database. The process 200 may (re)build derived objects that depend on a changed source object(s).

Compiling source objects of the first navigation database to generate derived objects of the first navigation database may include compiling such source objects of the first navigation database that do not correspond to any of the source objects of the second navigation database. Compiling source objects of the first navigation database that do not correspond to source objects of the second navigation database may account for deletion of objects in later releases of the first navigation database.

The process 200 may compile a subset of source objects of the second navigation database (Act 206). The subset of source objects of the second navigation database may include source objects that differ from the corresponding source objects specified in the first navigation database. Compiling the subset of source objects of the second navigation database may generate derived objects of the second navigation database. The subset of source objects of the second navigation database that consists of source objects that differ from the corresponding source objects specified in the first navigation database may be smaller that the set of all source objects of the first navigation database.

The subset of source objects of the second navigation database that includes source objects that differ from the corresponding source objects of the first navigation database may not include all source objects that differ from the corresponding source objects specified in the first navigation database. The update package may include the blocks, or a portion of such blocks, of the second navigation database that differ from the corresponding blocks of the first navigation database.

A user may select source objects of the second navigation database used for the compilation and/or blocks to be included in the update package. The process 200 may provide customized updates to the first navigation database based on user needs or preferences. The second database may include, in one example, data for digital maps for all of a continent (e.g., Europe) while the user of the first navigation database may be interested in an updated version of the digital map data relating to only a specific country (e.g., Italy). The update package used to update the first navigation database may accordingly include blocks of the source and derived objects of the second navigation database that differ from the respective blocks of the first navigation database and relate to the digital map representation of that country. Blocks of the second navigation database that differ from the corresponding blocks of the first navigation database may represent a city or a country or a province or a federal state or a continent, where the data organized in the blocks represent digital map data of these geographic entities. A block update for a city or a country may, therefore, be carried out in a time efficient way through adaptive selection of the respective blocks for an update.

Each block may be directly accessible for compilation and updating without the need for data compression of blocks or other large parts of the databases. Data compression may be carried out for the records contained in the blocks.

The process 200 may group the source objects and the derived objects of the first navigation database in blocks of the first navigation database (Act 208). The process 200 may group the source objects and the derived objects of the second navigation database in blocks of the second navigation database (Act 210). The process 200 may compare blocks of the first navigation database with blocks of the second navigation database to identify any blocks of the second navigation database that differ from the corresponding blocks of the first navigation database (Act 212). If a POI or other locality has been removed in the time period between the issuance of the first and second navigation databases, the block containing the record specifying this object, and blocks containing records specifying derived object depending on the POI in the first navigation database, may be identified during the comparing of the compiled blocks of the first and second navigation databases.

The process 200 may generate an update package that includes blocks of the second navigation database that differ from the corresponding blocks of the first navigation database (Act 214). The update package may be generated from the first navigation database as it is physically realized in a particular vehicle or from an identical copy of the first navigation database. Compilation and generation of the update package may be carried out on a target navigation system, where at least parts of the compiler software may be installed on the target navigation system that includes the first navigation database to be updated. As an alternative, the update package may be generated by the provider or by the customer on his or her personal computing device.

The process 200 may update the first navigation database based on the update package (Act 216). Each block may be assigned a unique block number and within each of the blocks each record may be assigned a unique record number. Each object may be identified uniquely by a block number and a record number. The block number and the record number may be a physical object ID (identification). The first and the second navigation database data may be organized by a logical object ID that identifies references between objects of one block and objects of other blocks within a database. The block update may modify the ID mapping of logical to physical IDs contained in each of the databases to maintain the referential integrity or consistency between unchanged and changed blocks in the first navigation database. After a full update, the ID mapping may be set to unity, such as by setting equal the logical and physical IDs for each object.

Figure 3:
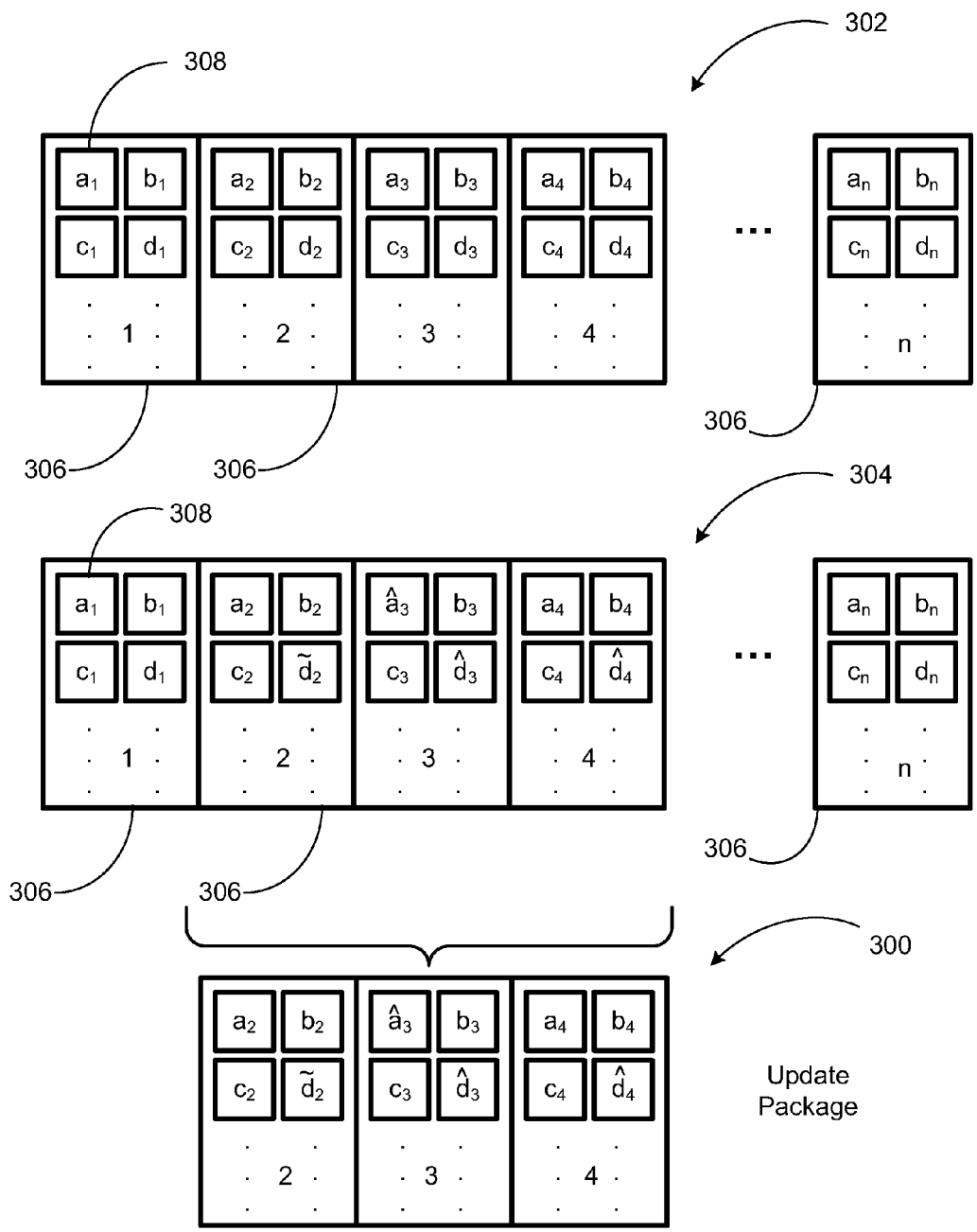
FIG. 3 is an exemplary update package generated based on a comparison of a first database and a second database.

FIG. 3 is an exemplary update package 300 that is based on a comparison of a first database 302 and a second database 304. The second database 304 may be similar to the first database 302 and may include one or more modified records relative to the first database 302. The update package 300 may be based on differences between the first database 302 and a second database 304 and used to update the first database 302 with the modifications reflected in the second database 304. In each of the databases 302 and 304, data may be grouped in logically related blocks 306. The blocks 306 may include sizes of about 5 to about 64 kbytes.

Each of the blocks 306 includes records 308 associated with a unique object. A block 306 may include about $2^{16}$ records 308. The blocks 306 may also include more or less than $2^{16}$ records. Each record 308 may include integer numbers, character strings, pointers, or other data types. The objects associated with the records 308 may include a road, a polygon, a street intersection, a landmark, or other geographic objects and/or localities. The objects may include closure of a street, speed limit zone, or other attributes of a geographic object. The records 308 may include a self-describing format. A self-describing format may allow software of a navigation system to skip unknown record types and/or unknown attributes of records with known types, or to be configured to receive supplements of the first navigation database. Each block may be directly accessible without accessing a de-compression function.

Each block 306 may be assigned a unique block number. Each record 308 within a block may be assigned a record number. The block number and record number may be used to identify each object. Within each block 306 objects may be referenced by position and offset. References between objects specified by records of different blocks 306 may be specified by logical object IDs that include a logical block number and a logical record number.

Each of the blocks of the first database may correspond to a block of the second database. In FIG. 2, the first and second databases 302 and 304 each include a block numbered 1 that includes records labeled as $a_1$, $b_1$, $c_1$, and $d_1$. Block number 1 of the first database 302 and block number 1 of the second database 304 may be identical. Record $a_1$ of the first database 302 corresponds to record $a_1$ of the second database 304, record $b_1$ of first database 302 corresponds to record $b_1$ of the second database 304, record $c_1$ of first database 302 corresponds to record $c_1$ of the second database 304, and record $d_1$ of first database 302 corresponds to record $d_1$ of the second database 304.

Block number 2 of the second database 304 may include records $\tilde{a}_2$ and $\tilde{d}_2$ that are modified relative to the corresponding records $a_2$ and $d_2$ of block number 2 of the first database 302. Block number 3 of the second database 304 includes records $\hat{a}_3$ and $\hat{d}_3$ and block number 4 of the second database 304 contains the record $\hat{d}_4$, where the circumflex denotes that the marked record is associated with an object that is derived from one or more of the modified objects $\tilde{a}_2$ and $\tilde{d}_2$ of block number 2 of the second database 304.

The derived objects may represent data compiled from one or more of the modified objects $\tilde{a}_2$ and $\tilde{d}_2$ by a compiler. The derived objects may represent data generated to speed up the operation of a navigation system. Map geometry and road topology at lowest levels, as well as street names, may represent source data, whereas high-level tiles of roads may be derived from elementary 0-level tiles. The lowest 0-level tiles may be distinguished from higher level tiles by the represented edge length. The lowest level scale may comprise tiles of hundred of meters whereas higher levels may comprise kilometer-length tiles.

The first database 302 may provide information related to dependencies of objects on other derived or source objects. In the databases 302 and 304, the records $a_2$ and $d_2$ of the first database 302 and the corresponding modified versions $\tilde{a}_2$ and $\tilde{d}_2$ of the second database 304 may specify source objects. Records $a_3$, $d_3$, and $d_4$ may depend on records $a_2$ or $d_3$ and specify derived objects.

The update package 300 may be obtained to include block numbers 2, 3, and 4 of the second database 304, which represent blocks of the second database 304 that differ from the corresponding blocks of the first database 302. A block update of the first database 302 may be performed by installing the update package 300. As an alternative, only those blocks of the first database 302 are updated that contain records specifying objects that are derived from or correspond to objects that are modified in the second database 304 with respect to the first database 302. If in the second database 304 a source object has been modified with respect to the first database 302, the block containing this source object is included in the update package. Not all of the objects contained in a block need to be compiled for the update procedure. Blocks including records that depend on modified records may be updated whether or not they include records specifying source objects that are modified in the second database 304 with respect to the first database 302.

If record $\tilde{a}_2$ of the second database 304 specifies an object representing a street with a modified attribute, such as a changed street name or a new traffic light, on a low level with tiles on a scale of hundreds of meters, $\hat{a}_3$ may be a record specifying the same street on a higher level of graphical representation with tiles on, for example, a kilometer scale. An update of $a_2$ in the first database 302 may entail an update of $a_3$ of the first database 302.

Figure 4:
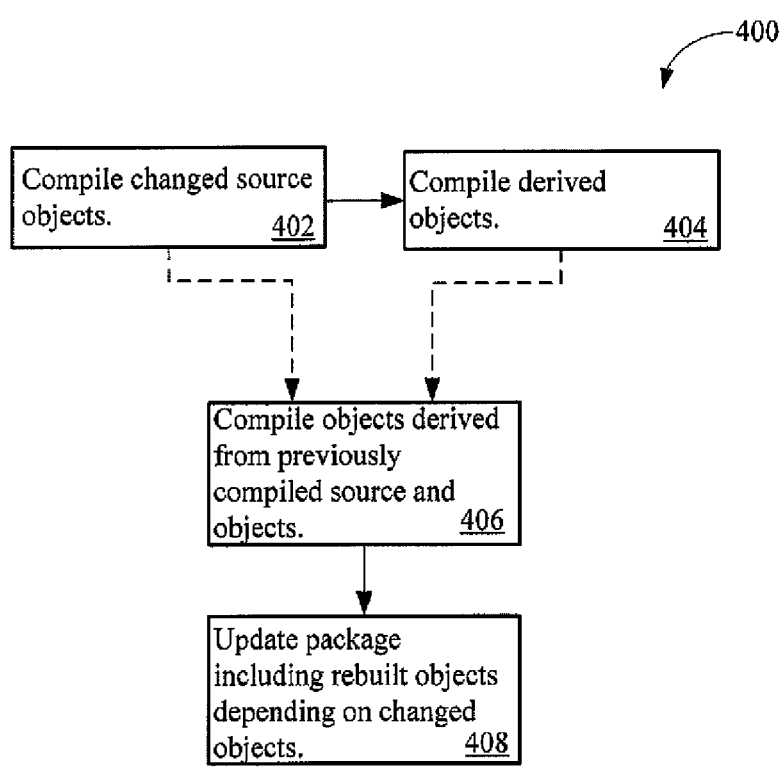
FIG. 4 is an exemplary process for incrementally updating a block of a navigation database.

FIG. 4 is an exemplary process 400 for incrementally updating a block of a navigation database. During update of a navigation database, a database compiler may compile modified source objects (Act 402) and derived objects on which other derived objects may depend (Act 404). Derived objects may be compiled from at least some of the previously compiled source objects and derived objects (Act 406). The dependency relation introduced may be used for an incremental database compiling. As the database compiler has access to previously compiled derived objects, the compiler may scan all object dependencies, including dependencies on source objects or other derived objects, and rebuild only objects that depend on modified ones (either source objects or derived objects) to generate an update package. After completion of the compilation process an update package may be built that includes all rebuilt objects that depend on changed objects (Act 408).

Figure 5:
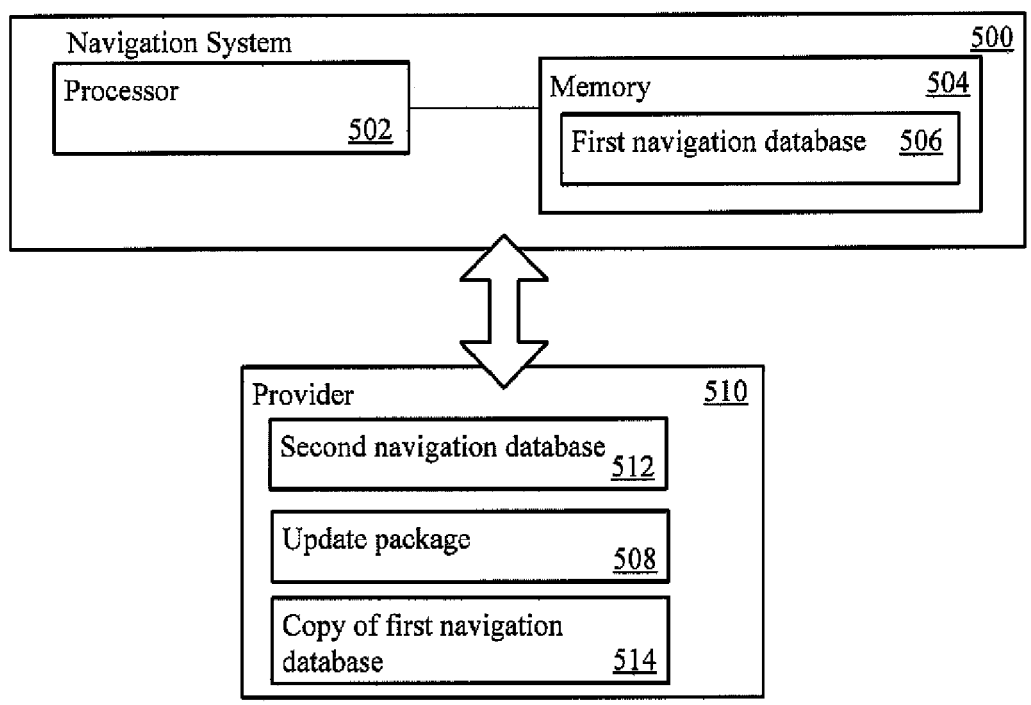
FIG. 5 is an exemplary navigation system.

FIG. 5 is an exemplary navigation system 500 including a processor 502 and a memory 504. The processor 502 may execute instructions stored in the memory 504 to control operation of the navigation system 500.

Although selected aspects, features, or components of the implementations are depicted as being stored in the memory 504, all or part of the systems, including the methods and/or instructions for performing such methods consistent with the navigation system 500, may be stored on, distributed across, or read from other computer-readable media, for example, secondary storage devices such as hard disks, floppy disks, and CD-ROMs; a signal received from a network; or other forms of ROM or RAM either currently known or later developed.

Specific components of the navigation system 500 may include additional or different components. The processor 502 may be implemented as a microprocessor, microcontroller, application specific integrated circuit (ASIC), discrete logic, or a combination of other types of circuits or logic. Similarly, the memory 504 may be DRAM, SRAM, Flash, or any other type of memory. Parameters (e.g., dependency information), databases, and other data structures may be separately stored and managed, may be incorporated into a single memory or database, or may be logically and physically organized in many different ways. Programs, processes, and instruction sets may be parts of a single program, separate programs, or distributed across several memories and processors.

The memory 504 may store a first navigation database 506. The first navigation database may include vehicle navigation, geographic, and/or other data related to digital maps. The processor 502 may obtain an update package 508 from a provider 510. The provider 510 may be a vendor and/or distributor of digital maps and other navigation related information. The processor 502 may execute instructions stored on the memory 504 to update the first navigation database 506 based on the update package 508.

The update package 508 may be generated based on differences between data blocks of the first navigation database 506 and a second navigation database 512. The second navigation database 512 may be a modified version of the first navigation database 506, such as a new release of the first navigation database that provides up-to-date navigation, geographic, and/or other information or data related to digital maps. The provider 510 may include a copy of the first navigation database 506 to compare with the second navigation database 512 to generate the update package 508. In an alternative, the provider 510 may transmit the second navigation database 512 to the navigation system 500 and the processor 502 may execute instructions stored on the memory 504 to generate an update package. The memory 504 may store a compiler program to compile objects of the first and/or second navigation databases 506 and 512.

The disclosed methods, processes, programs, and/or instructions may be encoded in a signal bearing medium, a computer-readable medium such as a memory, programmed within a device such as on one or more integrated circuits, or processed by a controller or a computer. If the methods are performed by software, the software may reside in a memory resident to or interfaced to a communication interface, or non-volatile or volatile memory. The memory may include an ordered listing of executable instructions for implementing logical functions. A logical function may be implemented through digital circuitry, through source code, through analog circuitry, or through an analog source such as an analog electrical, audio, or video signal. The software may be embodied in any computer-readable or signal-bearing medium for use by, or in connection with, an instruction executable system, apparatus, or device. Such a system may include a computer-based system, a processor-containing system, or another system that may selectively fetch instructions from an instruction-executable system, apparatus, or device that may also execute instructions.

A "computer-readable medium," "machine-readable medium," "propagated-signal medium," and/or "signal-bearing medium" may comprise any medium that contains, stores, communicates, propagates, or transports software for use by or in connection with an instruction-executable system, apparatus, or device. The computer-readable medium may selectively be, but not limited to, an electronic, magnetic, optical, electromagnetic, infrared, or semiconductor system, apparatus, device, or a propagation medium. A non-exhaustive list of examples of a computer-readable medium include: an electrical connection electronic having one or more wires, a portable magnetic or optical disk, a volatile memory such as a Random Access Memory "RAM," a Read-Only Memory "ROM," an Erasable Programmable Read-Only Memory (EPROM or Flash memory), or an optical fiber. A computer-readable medium may also include a tangible medium upon which software is printed, as the software may be electronically stored as an image or in another format (e.g., through an optical scan), then compiled and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method for updating a first navigation database, comprising:
compiling source objects stored as records in blocks of the first navigation database to generate derived objects of the first navigation database, the source objects including objects at a lowest organizational level of a map and derived objects including objects derived from source objects at a higher organizational level;
compiling a subset of source objects of a second navigation database to generate derived objects of the second database, where the source objects of the second navigation database are stored as records in blocks corresponding to the blocks of the first navigation database, and where the subset includes source objects of the second navigation database that differ from the corresponding source objects specified in the first navigation database;

comparing the blocks of the first navigation database having the derived objects of the first navigation database with the corresponding blocks of the second navigation database having the derived objects of the second navigation database to determine blocks of the second navigation database that differ from the corresponding blocks of the first navigation database; and generating an update package for the first navigation database comprising the blocks of the second navigation database that differ from the corresponding blocks of the first navigation database;

after the step of compiling the source objects of the first navigation database, grouping the source objects and the derived objects of the first navigation database in blocks of the first navigation database; and after the step of compiling the source objects of the second navigation database, grouping the source objects and the derived objects of the second navigation database in blocks of the second navigation database;

where the first navigation database comprises dependency information associated with the derived objects of the first navigation database;

where the dependency information comprises information about dependencies of the derived objects on source objects or on other derived objects.

2. The method of claim 1, further comprising:

identifying any source objects of the first navigation database that do not correspond to any source objects of the second navigation database; and compiling the source objects of the first navigation database that do not correspond to any source objects of the second navigation database.

3. The method of claim 1, where most of the source objects of the first navigation database are compiled to generate the derived objects of the first navigation database.

4. The method of claim 1, where each object is identified with a physical object ID comprising a block number associated with each block and a record number associated with each record of each block.

5. The method of claim 4, where references between objects of the first and second databases are identified by a logical object ID comprising a logical, block number and a logical record number.

6. The method of claim 4, further comprising updating the first navigation database based on the update package.

7. The method of claim 6, further comprising, if the update package comprises a number of blocks equal to the number of blocks of the first navigation database, setting each physical object ID to equal the logical object ID after updating the first navigation database.

8. The method of claim 1, further comprising determining which blocks of the second navigation database to compile based on user preferences.

9. A navigation system comprising:

a processor;

a first navigation database having blocks that include records specifying an object of the first navigation database, where each block comprises at least one record that specifies a source object;

a memory coupled to the processor, the memory having instructions stored on the memory that, when executed, cause the processor to:

compile the source objects of the first navigation database to generate derived objects of the first navigation database, the source objects including objects at a lowest organizational level of a map and derived objects including objects derived from source objects at a higher organizational level;

compile a subset of source objects of a second navigation database that includes blocks of records specifying source objects where the blocks correspond to the blocks of the first navigation database, the subset including source objects of the second navigation database that differ from the corresponding source objects specified in the first navigation database, where compiling the subset of source objects generates derived objects of the second navigation database;

group the source objects and the derived objects of the first navigation database in data blocks of the first navigation database;

group the source objects and the derived objects of the second navigation database in data blocks of the second navigation database;

compare the data blocks of the first navigation database with the data blocks of the second navigation database;

identify data blocks of the second navigation database that differ from the corresponding blocks of the first navigation database;

generate an update package based on the data blocks of the second navigation database that differ from the corresponding data blocks of the first navigation database; and update the first navigation database based on the update package;

where the first navigation database comprises dependency information associated with the derived objects of the first navigation database;

where the dependency information comprises information about dependencies of the derived objects on source objects or on other derived objects.

10. The system of claim 9, the memory further comprising user preferences.

11. The system of claim 10, where the instructions that cause the processor to generate the update package comprise instructions that, when executed, cause the processor to customize the update package based on the user preferences.

12. The system of claim 9, where the first navigation database comprises dependency information associated with the derived objects of the first navigation database.

13. The system of claim 11, where the dependency information comprises information about dependencies of the derived objects on source objects or on other derived objects.

14. The system of claim 9, the memory further comprising instructions that, when executed, cause the processor to:

identify source objects of the first navigation database that do not comprise a corresponding source object in the second navigation database; and compile the source objects of the first navigation database identified as not comprising a corresponding source object in the second navigation database.

15. A product comprising:

a non-transitory computer readable medium; and instructions stored on the medium that, when executed, cause a processor in a vehicle navigation system to:

compile the source objects of a first navigation database to generate derived objects of the first navigation database, the source objects including objects at a lowest organizational level of a map and derived objects including objects derived from source objects at a higher organizational level;
identify a subset of source objects specified in a second navigation database that correspond to source objects specified in the first navigation database, the subset having source objects that differ from corresponding source objects specified in the first navigation database;
compile the subset of source objects of the second navigation database to generate derived objects of the second navigation database and to generate dependency information of the first navigation database;
identify, based on dependency information, the derived objects of the first navigation database that differ from the corresponding derived objects of the second navigation database;
group the source objects and the derived objects that differ from the corresponding derived objects of the second navigation database in data blocks of the first navigation database;
group the source objects and the derived objects of the second navigation database in data blocks of the second navigation database;
compare the data blocks of the first navigation database with the data blocks of the second navigation database;
identify data blocks of the second navigation database that differ from the corresponding blocks of the first navigation database;
generate an update package based on the blocks of the second navigation database that differ from the corresponding blocks of the first navigation database; and
update the first navigation database based on the update package;
where the first navigation database comprises dependency information associated with the derived objects of the first navigation database;
where the dependency information comprises information about dependencies of the derived objects on source objects or on other derived objects.

16. The product of claim 15, where the instructions stored on the computer-readable medium, when executed, further cause the processor in a navigation system to determine which blocks of the second navigation database to compile based on user preferences.

17. The product of claim 15, where the instructions stored on the computer-readable medium, when executed, further cause the processor in a navigation system to:
identify any source objects of the first navigation database that do not correspond to any source objects of the second navigation database; and
compile the source objects of the first navigation database that do not correspond to any source objects of the second navigation database.

18. The product of claim 15, the computer-readable medium further comprising a physical object ID comprising a block number associated with each block and a record number associated with each record of each block.

19. The product of claim 18, where references between objects of the first and second databases are identified by a logical object ID comprising a logical block number and a logical record number, and where the instructions stored on the computer-readable medium, when executed, further cause the processor in a navigation system to set each physical object ID to equal the logical object ID after updating the first navigation database.

20. A system for generating an update package for a navigation system having a navigation database, the system comprising:
a processor;
a first parent database, the navigation database comprising a copy of the first parent database;
a second parent database reflecting modifications to the first parent database, where each of the first and second parent databases comprise blocks of records, each block having at least one record that specifies a source object at a lowest organizational level of a map, and where each block of the second parent database corresponds to a block of the first parent database; and
a memory coupled to the processor, the memory comprising:
instructions stored on the memory that, when executed, cause the processor to:
compile one or more of the source objects of the first parent database to generate derived objects of the first parent database and to generate dependency information, the derived objects include objects at a higher organizational level of a map derived from source objects;
compile one or more of the source objects of the second parent database to generate derived objects of the second parent database;
identify, based on the dependency information, derived objects of the first parent database that differ from the corresponding derived objects of the second parent database;
group the source objects and the derived objects that differ from the corresponding derived objects of the second parent database in data blocks of the first parent database;
group the source objects and the derived objects of the second parent database in data blocks of the second parent database;
compare the data blocks of the first parent database with the data blocks of the second parent database
identify data blocks of the second parent database that differ from the corresponding blocks of the first parent database;
generate an update package based on the blocks of the second parent database that differ from the corresponding blocks of the first parent database; and
transmit the update package to the navigation system;
where the first navigation database comprises dependency information associated with the derived objects of the first navigation database;
where the dependency information comprises information about dependencies of the derived objects on source objects or on other derived objects.

21. The system of claim 20, where the instructions that, when executed, cause the processor to transmit the update package to the navigation system comprises instructions that, when executed, cause the processor to transmit the update package via the Internet.

22. The system of claim 20, where the instructions that, when executed, cause the processor to transmit the update package to the navigation system comprises instructions that, when executed, cause the processor to:
store the update package on a non-transitory computer-readable medium; and
transmit the computer-readable medium to the navigation system.

* * * * *